(No Model.) 8 Sheets—Sheet 2.

H. A. RIGGS.
BRICK OR TILE CUTTER.

No. 504,364. Patented Sept. 5, 1893.

Witnesses
Jas. H. McCathran
Bernice A. Wood

Inventor
Horace A. Riggs
By his Attorneys,
C. A. Snow & Co.

(No Model.) 8 Sheets—Sheet 5.

H. A. RIGGS.
BRICK OR TILE CUTTER.

No. 504,364. Patented Sept. 5, 1893.

Witnesses
Jas. K. M?Cathran
Bernice A. Wood

Inventor
Horace A. Riggs
By his Attorneys,
C A Snow & Co.

(No Model.) 8 Sheets—Sheet 6.
H. A. RIGGS.
BRICK OR TILE CUTTER.
No. 504,364. Patented Sept. 5, 1893.
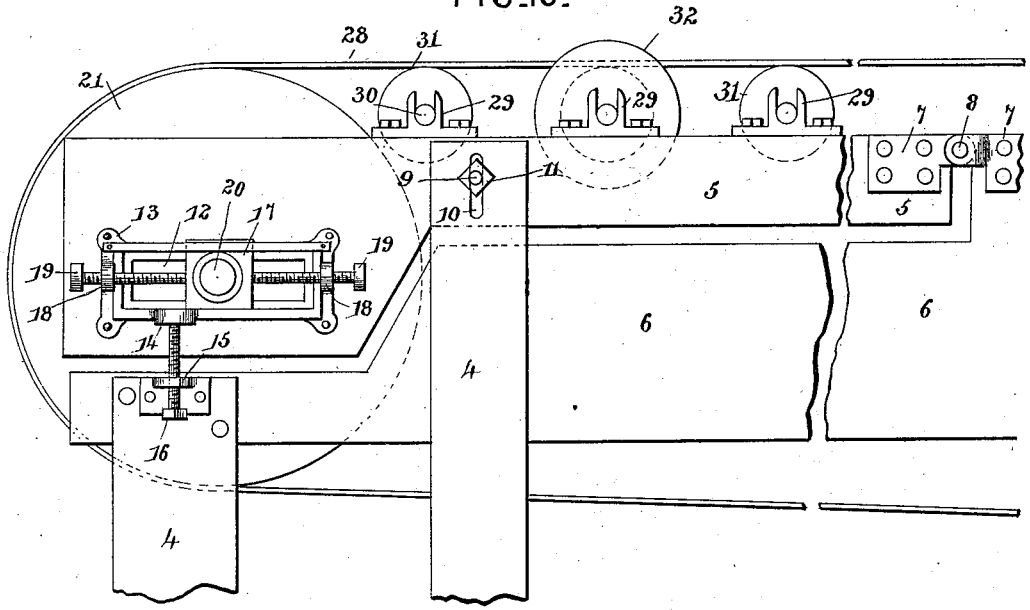
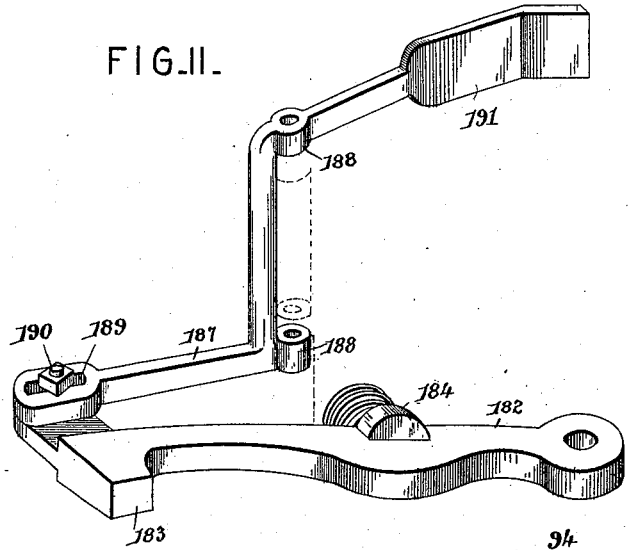
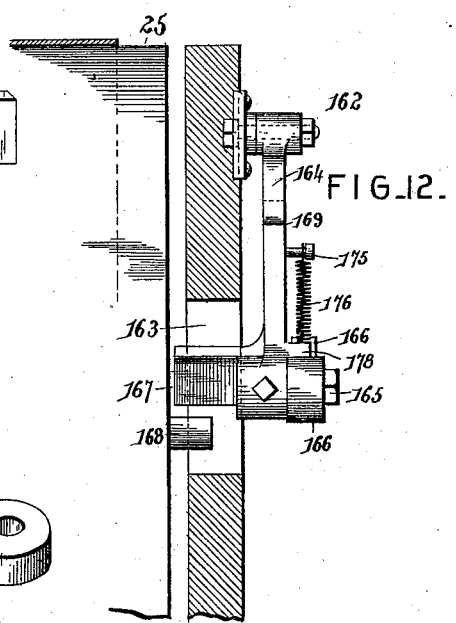
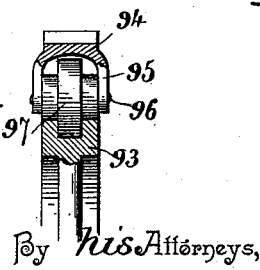
Witnesses
Jas. K. McCathran
Bernice A. Wood
Inventor
Horace A. Riggs
By his Attorneys,
C. A. Snow & Co.

(No Model.) 8 Sheets—Sheet 7.

H. A. RIGGS.
BRICK OR TILE CUTTER.

No. 504,364. Patented Sept. 5, 1893.

Witnesses
Jas. K. McCathran
Bernice A. Hood

Inventor
Horace A. Riggs
By his Attorneys,
C. A. Snow & Co.

(No Model.) 8 Sheets—Sheet 8.
H. A. RIGGS.
BRICK OR TILE CUTTER.
No. 504,364. Patented Sept. 5, 1893.
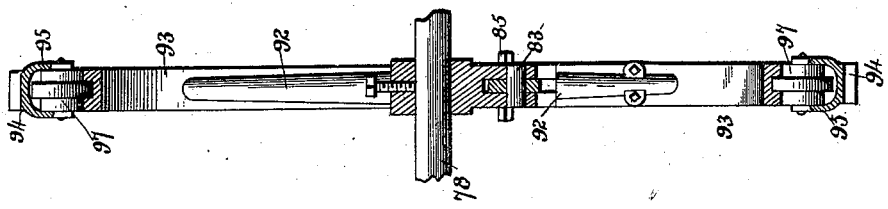
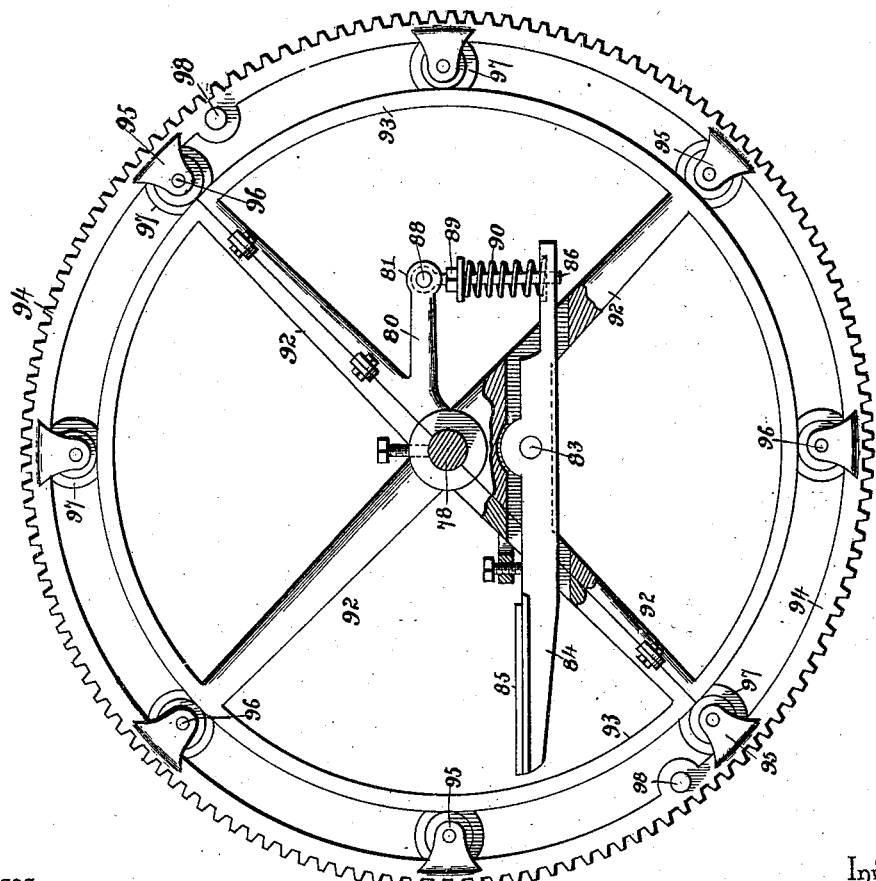
Witnesses
Jas. K. McCathran
H. G. Pierson
By his Attorneys,
C. A. Snow & Co.
Inventor.
Horace A. Riggs

UNITED STATES PATENT OFFICE.

HORACE A. RIGGS, OF PLYMOUTH, OHIO.

BRICK OR TILE CUTTER.

SPECIFICATION forming part of Letters Patent No. 504,364, dated September 5, 1893.

Application filed August 9, 1892. Serial No. 442,591. (No model.)

*To all whom it may concern:*

Be it known that I, HORACE A. RIGGS, a citizen of the United States, residing at Plymouth, in the county of Richland and State of Ohio, have invented a new and useful Brick or Tile Cutting Machine, of which the following is a specification.

This invention relates to improvements in machines for cutting brick or tiles; and the objects in view are to embody a machine of comparatively cheap and simple construction, which is adapted to accurately and rapidly cut bricks or tiles from a continuous column of clay as the same passes from the brick molding machine; to provide means for adapting the machine for operation upon clay of varying stiffness; to provide means for preventing the breakage of the cutters, should they accidentally contact with stones or other foreign objects embedded in the clay; to provide means for rapidly starting and stopping the cutting mechanism; and finally, to adapt the feed-table for ready adjustment whereby it is capable of receiving the column of clay from the brick machines of varying heights, thus obviating the necessity of raising or lowering said machines, whose ponderous weight would render such a feat difficult.

Various other objects and advantages too numerous to herein mention will readily present themselves to those skilled in this class of machinery, and will appear in the following description; and the novel features of the invention will be particularly pointed out in the appended claims.

Figure 1:
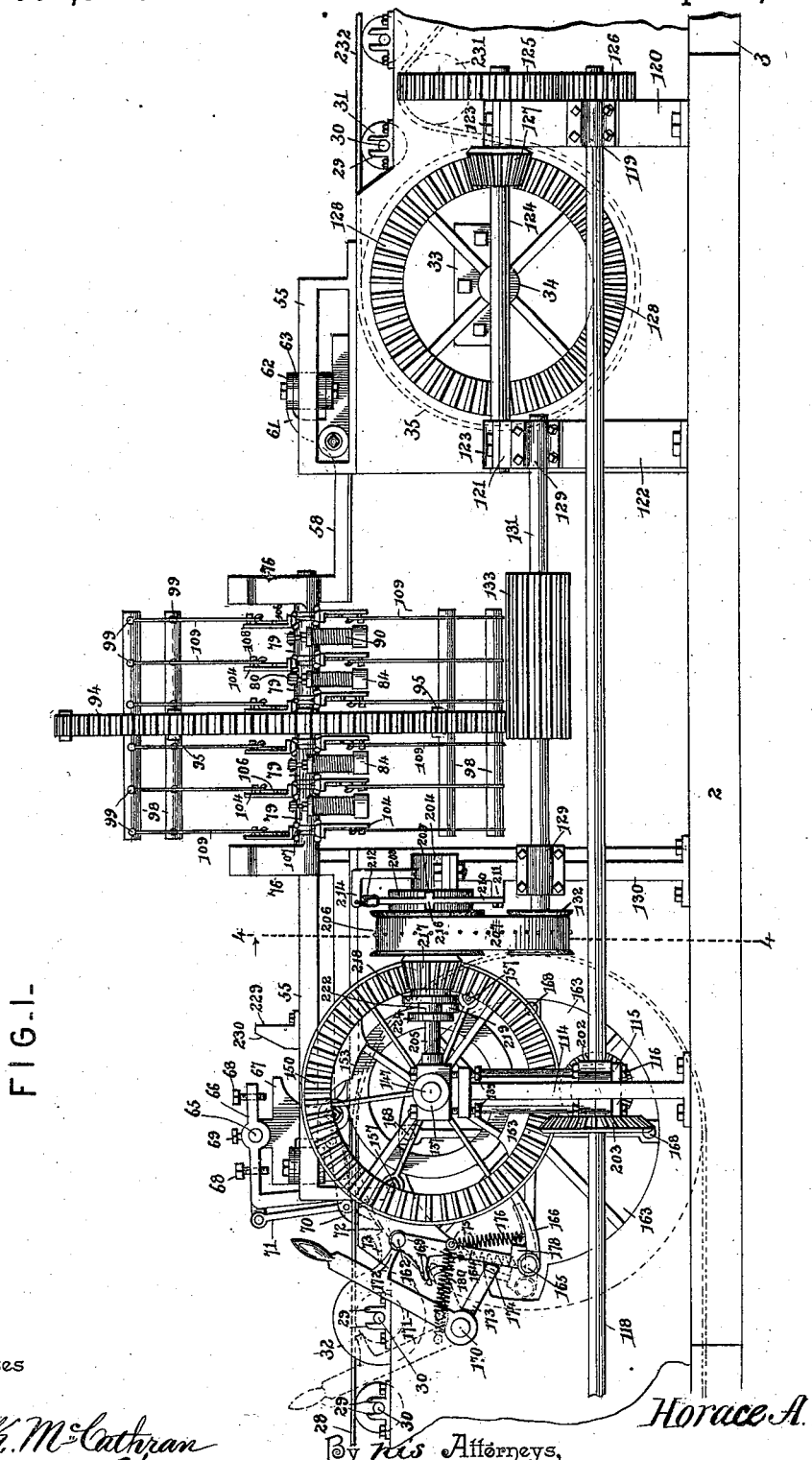
Figure 2:
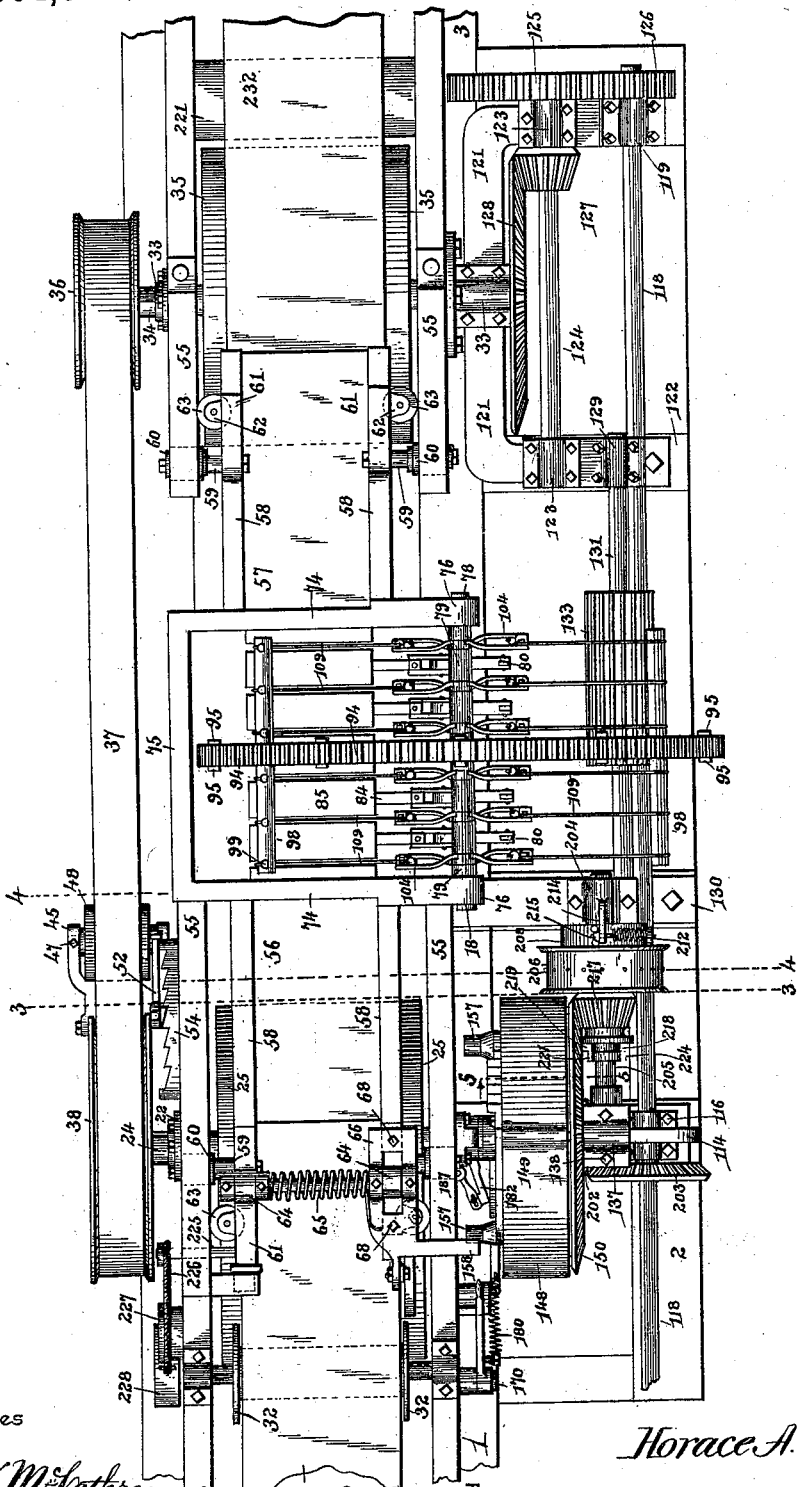
Figure 3:
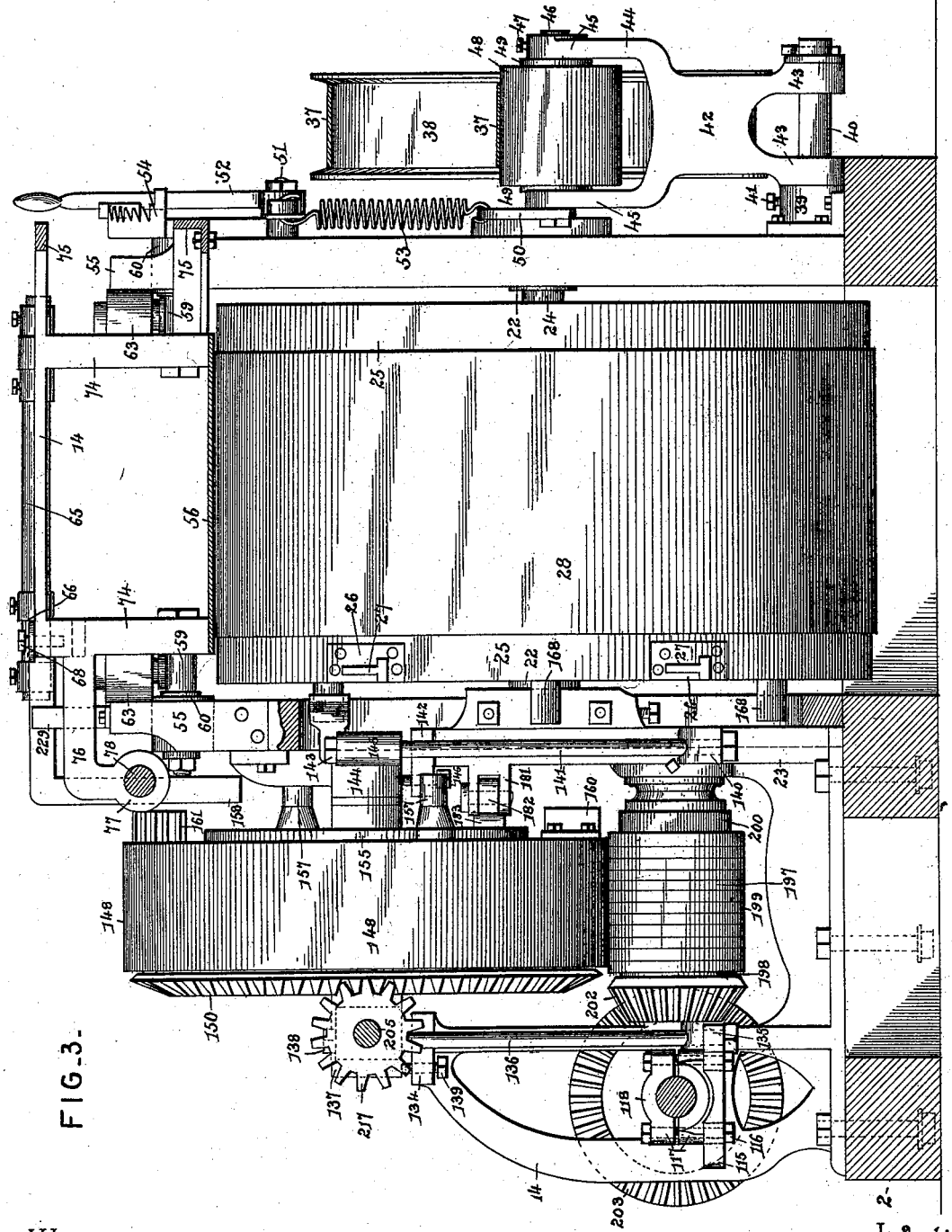
Figure 4:
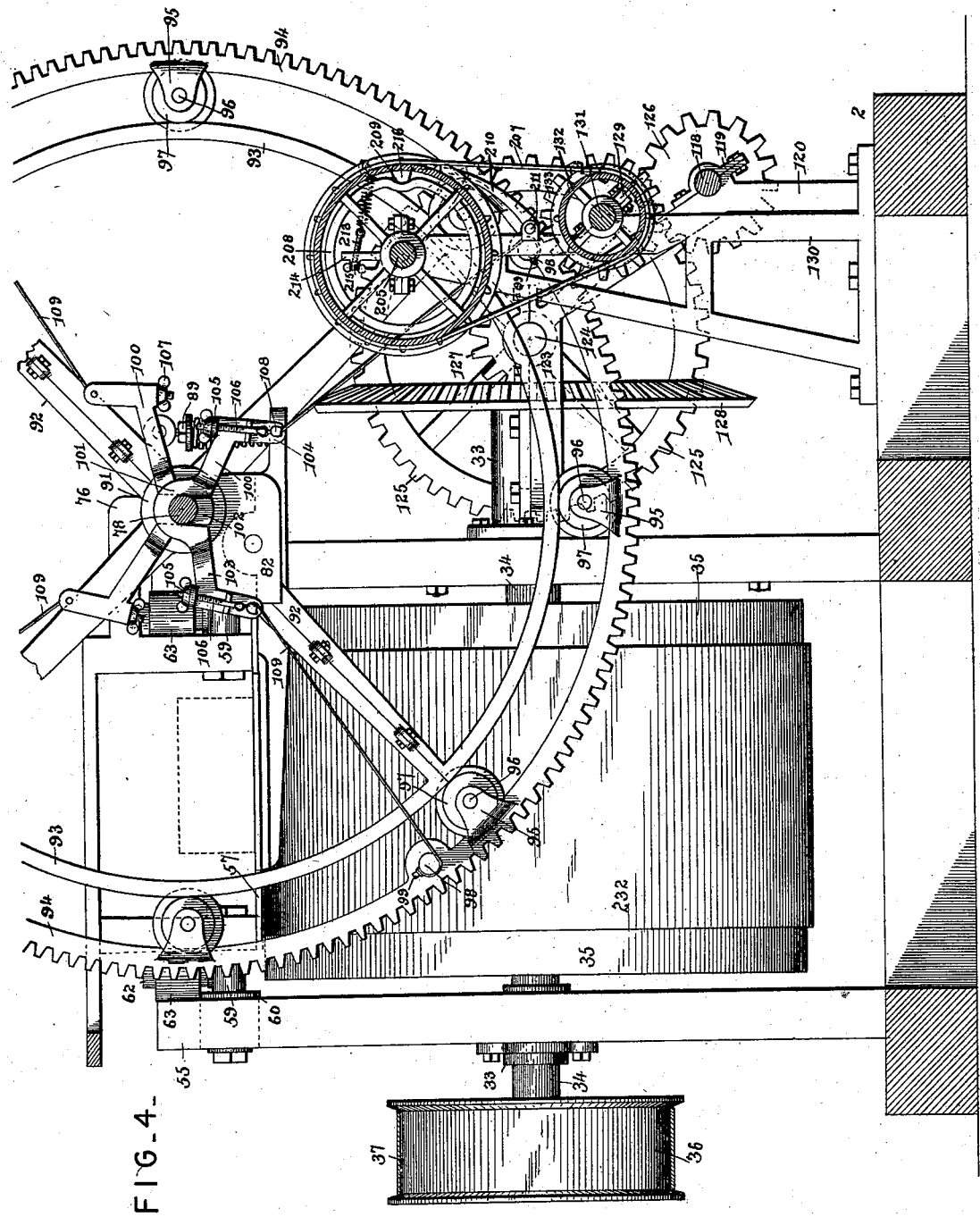
Figure 5:
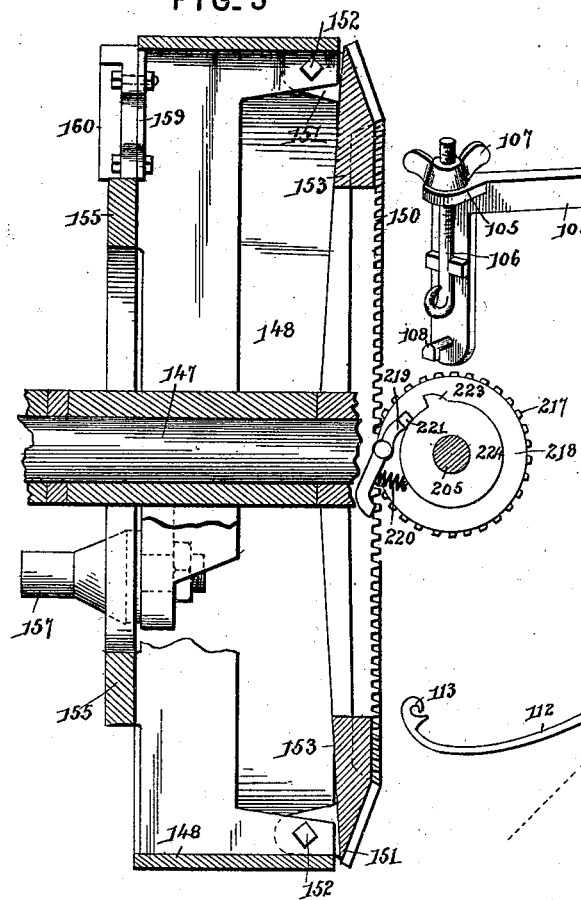
Figure 6:
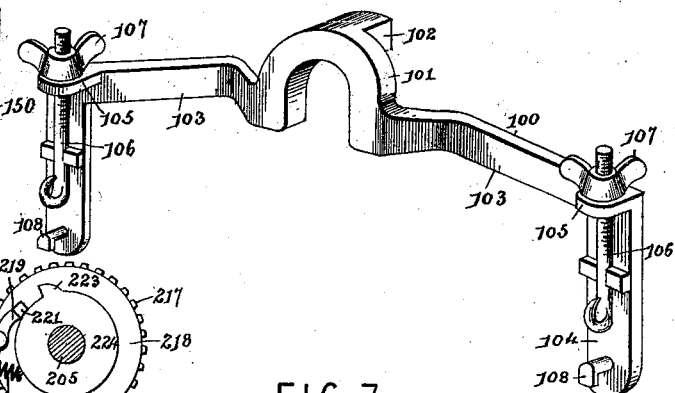
Figure 7:
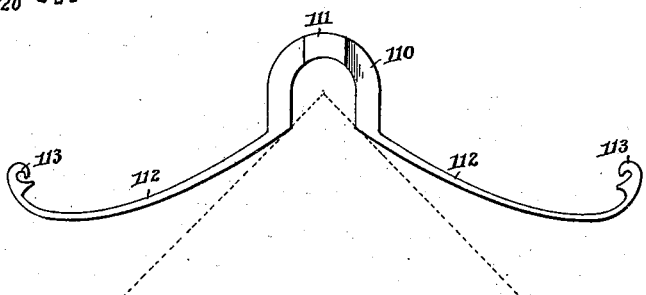
Figure 8:
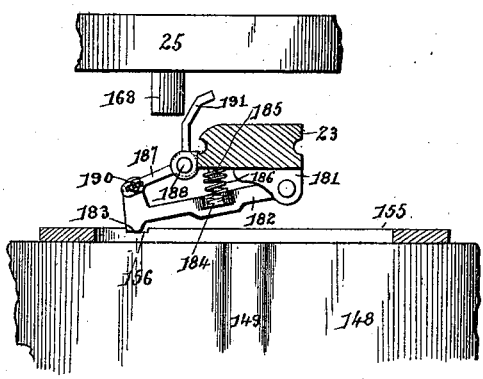
Figure 9:
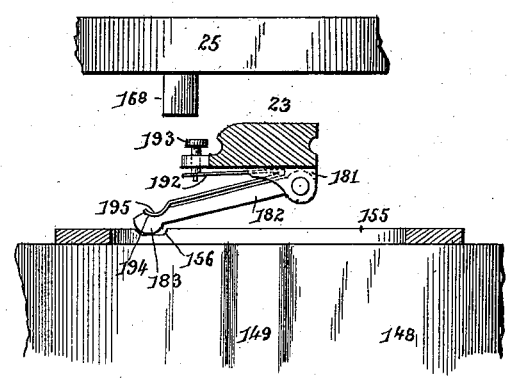
Figure 14:
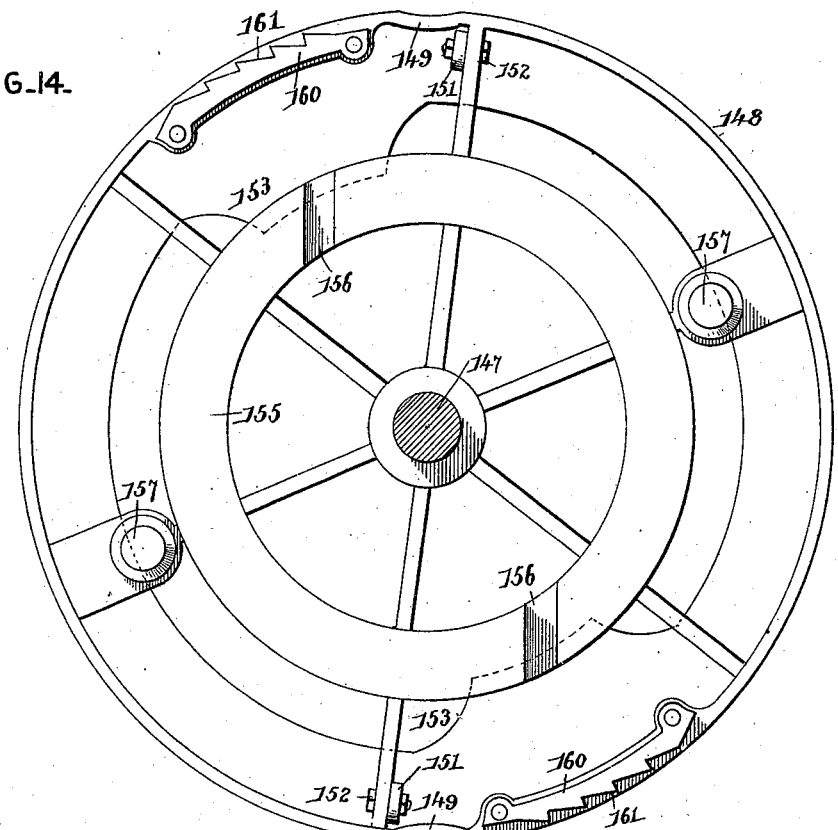
Figure 15:
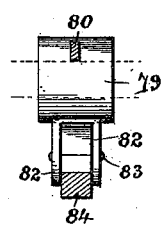
Figure 16:
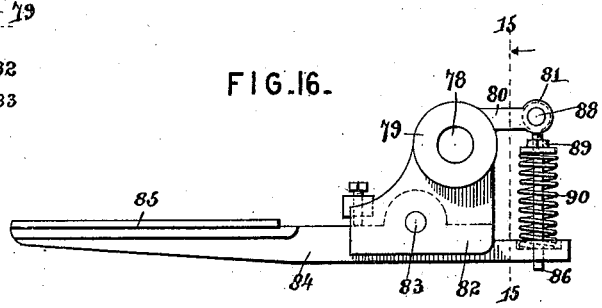

Referring to the drawings—Figure 1 is a side elevation of the right side of the machine, the feed and delivery portions being broken away. Fig. 2 is a top plan view of the same. Fig. 3 is a transverse vertical section on the line 3—3 of Fig. 2, including the front supporting arm of the longitudinal shaft of the carriage. Fig. 4 is a similar view on the line 4—4 of Figs. 1 and 2 looking in an opposite direction, or toward the rear end of the machine, omitting the front arm supporting the longitudinal shaft exhibited in Fig. 3. Fig. 5 is a radial section on the line 5—5 of Fig. 2. Fig. 6 is a detail in perspective of the preferred form of cutter-straining yoke. Fig. 7 is an elevation of a modified form of cutter-straining yoke. Fig. 8 is a partial plan and section, the parts being broken away, of the preferred form of mechanism for arresting the movement of the cutter-operating and carriage-returning mechanism. Fig. 9 is a similar view of a modified construction of the same mechanism. Fig. 10 is a side elevation of the forward portion of the feed-table, illustrating the manner of vertically adjusting the same and adjusting the boxes or bearings for the end-drum. Fig. 11 is a detail in perspective of the trip-lever illustrated in Fig. 8. Fig. 12 is a transverse section through the support of the shifting oscillating bell-crank lever for intermittently moving the carriage-return and cutter-operating device. Fig. 13 is a transverse section through the rim of the cutter-carrying wheel and its support. Fig. 14 is an inner face view of the wheel employed for returning the carriage and operating and cutting mechanism. Fig. 15 is a section on the line 15—15, of Fig. 16. Fig. 16 is a side elevation of one of the clay-supporting pallets and its support. Fig. 17 is a transverse section through the central pallet-support. Fig. 18 is a section of the wheel at this point.

Like numerals of reference indicate like parts in all the figures of the drawings.

In mounting the machine I employ suitable cross-sills 1, which, for the purpose of convenience in shipping, are preferably formed in three parts, which I have designated as 1, 2, and 3. The major portion of the feed mechanism or belt and its supports are carried by the sills 1, the delivery portion by the sills 3, and the mechanism for operating the carriage and cutters by the intermediate sills 2. The sills 1 support, by means of standards 4 rising therefrom and best shown in Fig. 10, the opposite sides of the feeding mechanism frame. These sides, near their ends, are formed in sections, designated as the upper movable sections 5, and the lower stationary sections 6, the lines of division commencing at points a short distance from the ends of the sections and extending forward to the ends thereof. The sections 5, at their adjacent or meeting ends with those of the sections 6, are provided with hinged members 7, which are connected, pivotally, by transverse pintles 8, whereby, as will be obvious, the sections 5 and mechanism carried thereby may be raised and lowered through the medium of devices to be hereinafter described. Short bolts 9 extend from the sections 5 outwardly through vertical slots 10 formed in a pair of the standards 4, and beyond said standards have mounted therein clamping-nuts 11, by which, when the sections 5 are raised and lowered, they may be securely locked in position by the aforesaid clamping-nuts. The front sections 5, above the pair of standards 4, are provided with longitudinal openings 12, which are surrounded upon their exteriors by oblong metal frames 13, whose corners, or other convenient portions, are provided with perforated securing-ears for the accommodation of bolts passed therethrough and through the sections 5. The under sides of the frames 13 are provided with out-standing lugs 14, which are vertically above brackets 15, that project from the front pair of standards 4, are perforated, and have threaded therein vertically-disposed supporting bolts 16, whose upper ends therefore rest against the under sides of the lugs 14 and aid in the adjustment and support of the movable portion of the feed-table.

The upper and lower sides of the frames 13 constitute suitable ways for a pair of opposite rectangular journal boxes 17, which are designed to slide or be movably mounted in the ways, and whose outer faces, being overlapped by the sides of the frames, will be secured from lateral displacement from the same. The ends of the frames 13 are provided with perforated lugs 18, in each of which is threaded an inwardly-disposed set-bolt 19, the inner ends of which impinge upon the opposite sides of the aforesaid journal boxes, and hence serve to securely lock the same at any point of adjustment within the frames. The boxes accommodate a transverse shaft 20, which carries a large drum 21 that revolves therewith and is, therefore, fixed thereupon.

In suitable bearings 22, formed in the rear end of the frame and in a vertical standard 23 which is located opposite the side and adjacent to an opening formed in the side of the frame, there is journaled a transverse shaft 24, and upon this shaft there is mounted, and adapted to rotate therewith, a large drum 25, which I preferably form solid or non-expansible, see Fig. 3. This drum has its periphery or surface, near one side, provided at intervals with countersunk metal plates 26, flush with the surface thereof, and upon each metal plate there is formed a superficial T-shaped lug or stop 27, whose function will hereinafter appear. An endless feed belt 28 passes around the drum 25, and also around the drum 21 at the front end of the machine. Between the two drums the edges of the side walls or frames are, at intervals, provided with open bearing-boxes 29, in each pair of which are loosely journaled the extremities of shafts 30, that extend transverse the frame and under the belt 28. These shafts accommodate rollers 31, at the ends of which are located circular flanges 32. These flanges are provided at intervals upon the rollers, and serve as guides to maintain the belt thereon.

From the foregoing description, it will be obvious that, by the construction of frame thus described, I am enabled to raise and lower the front portion of the feed-frame, together with the feed-belt carried thereby, and thus adapt it to the height of the brick-machine in which my machine is used in connection. This is an important part of my invention, and its utility and advantage will be at once recognized when the immense weight of brick and tile machines is considered; and which, were it not for this adjustment, would necessarily have to be, in many instances, raised or lowered, or the flooring cut away, to bring its discharge on a level or opposite the front end of the machine.

The rear or delivery portion of the machine is, preferably, constructed in a similar manner as the front or feeding portion thereof, that is, it is adjustable in the same manner, that is to say, as relates to the journal-boxes for the end-drum of the system of rollers.

33 designates a pair of opposite boxes, which are located near the front or inner end of the rear section of the framework, or that portion carrying the delivery mechanism. In these boxes there is journaled a transverse shaft 34, which within the frame supports a large drum 35, shown by dotted lines in Fig. 1 and in full lines in Fig. 4 of the drawings. The ends of the shaft 34 project beyond their bearings, and that end at the left side of the machine carries a pulley 36, which is connected through the medium of a belt 37, to a corresponding though larger pulley 38, which is mounted on the corresponding end of the shaft 24, whereby motion is communicated from the former shaft to the latter, which former shaft receives its motion in a manner to be described hereinafter. Any suitable belt-tightening device may be employed for operating upon the belt 37, between the pulleys 36 and 38, and I have herein illustrated one simple form whose construction might well be explained at this point.

As best shown in Fig. 3, from a bearing 39, projecting from a convenient sill between the two pulleys 36 and 38, there extends a stub-shaft 40, which is secured within the bearing against rotation by means of a binding-bolt 41. An arm 42 has its lower end bifurcated and provided with bearing eyes 43, which loosely receive the stub-shaft, and at its upper end is bifurcated at 44 and provided with bearing-eyes 45, said arm being secured in position by a link-pin passed through the end of the shaft 40. A short shaft 46 is located in the bearing-eyes 45, and is secured in position through the medium of a binding-bolt 47. A loose pulley 48 is mounted upon the shaft so as to freely revolve thereon and has located at opposite sides, intermediate its ends and the bearings 45, washers 49. The inner end of the shaft 46 is extended slightly beyond its inner bearing, and is provided with an arm 50, the lower end of the arm being loosely journaled upon the shaft. Above the arm a stub-shaft 51 projects from the frame and upon the same is loosely mounted at its angle a bell-cranked lever 52, whose lower branch has its outer end connected with the free end of the arm 50, by means of a coiled spring 53. A curved notched locking-standard or bar 54 surmounts the side of the frame, opposite the inner edge of the upper branch of the bell-crank lever, and, by reason of the loose mounting of said lever upon its fulcrum, which is the stub-shaft 51, may be thrown into or out of engagement with any one of said notches, whereby said lever becomes locked and the requisite tension of the pulley 48 against the under side of the belt 37 may be maintained.

Reference being made to Figs. 1 and 2, upon the upper edges and adjacent ends of the feed and delivery frames, oblong metal track-frames 55 are mounted and arranged opposite each other, said track-frames being bolted securely in position. The carriage platform comprises a receiving and a delivery section, which I have designated as 56 and 57, respectively. Each section is formed of thin metal or stock, and is provided, at opposite sides, with heavier metal side-bars 58. From the side-bars 58 of the section 57 extend outwardly short stub-shafts 59, whose outer ends take into the rear guide-frames mounted upon the delivery portion of the machine. These guide-frames serve as tracks for the rollers 60. Standards 61 rise from the section 57, near its rear end, and are provided with brackets 62, which extend outward therefrom and have journaled therein rollers 63, which are at a right angle to the rollers 60, and which run along the inner sides of the guide-frames. Corresponding rollers and shafts 60 and 59, respectively, project from the side-bars 58 of the platform-section 56, and likewise do rollers 63 project from standards 61 of the side-bars 58 of the platform-section 56, and rise against the inner sides of the guide-frames. In bearings 64, located upon the side bars 58 near the rear ends thereof and slightly in rear of the platform 56, there is mounted a transverse shaft 65. A rock arm or lever 66 is mounted on one end of the shaft and located above the standard 67, in which the bearings 64 are formed. This rock arm or lever is perforated at each side of the shaft 65, and through the perforations are passed and threaded set-bolts 68, whose lower ends are designed to form stops for limiting the vibrations of the lever 66 by coming in contact with the standard 67. The lever 66 is fixed upon the shaft 65, being secured in position through the medium of the binding bolts 69. 70 designates a pawl, best shown in Fig. 1, and said pawl has its inner end pivoted to the standard 67. The pawl extends forward beyond the standard where it is downwardly disposed and is loosely connected to the front end of the lever 66 by means of a link or connecting rod 71. The front end of the pawl is provided with a shoulder 72, and beyond the same with an upwardly-curved nose or projection 73. The free end of the pawl being the heavier and being pressed by the coiled spring about the shaft 65, the shoulder 72 thereof rests adjacent the surface of the drum 25, the position being regulated by means of the front bolt 68, whereby said shoulder lies in the path of the T-shaped lugs 27 that are carried by the drum 25, and thus motion, in a rearward direction, is imparted to the carriage as a whole.

Referring more particularly to Figs. 2 and 3 of the drawings, it will be seen that there rises from the inner end of each of the platform sections 56 and 57 inverted U-shaped frames 74, the ends of the frames being connected by upper and lower connecting-bars 75, which serve to brace said frames apart and render them rigid. From the outer sides of the vertical portions of the frames there extend horizontally and downwardly disposed hangers or arms 76, whose lower ends are provided with longitudinally opposite bearings 77, which accommodate and rigidly support a longitudinally-disposed shaft 78. At intervals upon the shaft 78 there are mounted, and spaced apart, and preferably cast thereon, hubs 79, each of which is provided with a tangentially-disposed arm 80, terminating at its outer end in an eye and bifurcated, as indicated at 81, and as best shown in Fig. 16. The lower side of these hubs is provided with a pair of depending ears 82, and pivoted between each pair of ears, upon a short transverse pin 83, is a pallet-supporting arm 84. The arms 84 each carry a pallet 85, and the series of pallets is arranged side by side and a slight distance apart between the inner edges of the platform-sections of the carriage. The outer end of each pallet-arm is provided with an opening or slot through which passes a bolt 86, the upper end of which terminates in an eye 87, that takes between the bifurcation 81 of the arm 80, and is pivoted thereto by a pin 88. The bolt 86 is threaded and carries a head 89, that is adjustable thereon and serves to compress or give the requisite tension to a coiled spring 90 interposed between the adjustable head and the rear end of the pallet-supporting arm. A set bolt in advance of each pair of lugs serves to limit the upward movement of the pallet-arm and thus the series of pallets is supported in horizontal alignment. Between any pair, but preferably the central pair, of hubs 79, there is located and securely bolted a sectional or clamping-hub 91, best shown in Fig. 4, and from the same radiates a series of spokes 92, whose outer ends join the fellies or sections of a circular rim 93. The rim 93 is encircled by an externally toothed or spurred gear-rim 94, which is provided at intervals upon its inner side with pairs of bearing-lugs 95, each pair of which has journaled therein the axle 96 of a grooved roller or wheel 97, which rides upon the rim 93, and the latter therefore constitutes a circular track. At intervals there project through openings formed in the spur-rim 94 transverse cylindrical bars 98 which are held rigidly in position and provided at uniform intervals with pins or keys 99 which pins are in radial alignment with the spaces formed between the hubs 79. In each of these spaces there is mounted a pair of reversely-disposed yokes 100, see Figs. 4 and 6. Each yoke is provided at its center with a semi-circular bowed portion 101, from each of which projects an inwardly-disposed lug 102. The arms 103 of the yokes are bent slightly in opposite directions and terminate in branches 104, disposed at an angle to the arms. A pair of ears 105 is located on each of the branches 104, and through the same pass eye-bolts 106, which are threaded and provided with thumb-nuts 107. Lugs 108 project from each of the branches beyond the ears, and in line with the eye-bolts, and wires 109 have their outer ends secured to the pins or keys 99, are stretched over the lugs 108, and secured to the eyes of the bolts 106. The yokes described embrace the opposite sides of the shaft 78, and being turned so as to be disposed in opposite directions interlock by means of their lugs 102 engaging with the open portions of the bows 101, so that, as will be obvious, each pair of yokes in this instance, accommodates four wire cutters; and at each quarter-revolution of the cutter-wheel 94, a series of bricks is cut equal to the number of sets of cutters.

In Fig. 7 I have illustrated a slightly modified construction of yoke, wherein, as will be seen by reference to said figure, the same consists of a bowed portion 110, having a lug 111, and having diverging resilient or spring arms 112, whose outer extremities terminate in hooks 113, designed to engage with the inner ends of the wire cutters, and thus lend the requisite tension. By thus locating the yokes radially opposite the pins 99, and also in line with the spaces existing between the adjacent pairs of pallets, it will be seen that when the cutter rotates the wires pass through the spaces between the pallets.

The base of the standard 23, as shown in Fig. 3, is preferably extended outwardly, and arising from the outer extremity thereof is an open standard 114. This standard supports a transverse plate 115, which as shown in dotted lines, is provided with elongated slots for the accommodation of a pair of bolts 116, arranged at each side of said standard. These bolts pass through the four corners of a pair of bearing-plates or blocks 117, which accommodate and rotatably support the longitudinally disposed power-shaft 118 arranged at one side of the machine and designed to be driven by any suitable motor. The rear end of the shaft is journaled in a bearing 119, Figs. 1 and 2, located at one side of a standard 120, and projecting slightly beyond the same.

The standard 120 supports one end of a U-shaped yoke 121, the opposite end thereof being supported by a vertical standard 122. Bearings 123 are formed upon the U-shaped yoke transversely opposite each other, and in the same is journaled a shaft 124, whose rear end is extended beyond its bearing, carries a spur-gear 125 which is engaged with and driven by a smaller gear 126, mounted on the extreme rear end of the power-shaft 118. The shaft 124 is provided between its bearings with a beveled pinion 127 which engages with and drives a bevel master-gear 128, located upon the right end of the transverse shaft 34 heretofore described. A bearing 129 is located upon the standard 122 and a corresponding bearing 129 is longitudinally opposite the same and secured to a standard 130 located adjacent to the inner end of the feed portion of the frame. These bearings 129 accommodate a counter-shaft 131, whose front end extends beyond its bearing and is provided with a toothed pulley 132, and between its bearings carries, and has fixedly mounted thereon, an elongated spur-gear 133, whose teeth engage with and drive the spur-rim 94.

The standard 114 is provided at its upper end, and near its lower end, with transverse projecting yokes 134 and 135, respectively, and the same are provided with openings in which is located a pair of vertical guide-rods 136, whose upper ends pass through perforations formed in a journal-box 137, located above the standard 114. The lower ends of the guide-rods are headed and their upper ends are threaded and receive clamping-nuts 138 which are designed to bind upon the upper sides of the journal-box 137. Passing upwardly through perforations formed in the upper yoke 134 are supporting-screws 139, whose upper ends take under the bearing-box 137 and support the same. The inner portion of the standard 23 Fig. 3 is provided near its lower end with a transverse yoke 140, which is perforated at opposite sides of the standard to receive a pair of vertical guide-rods 141. The upper ends of the guide-rods are above the end of the standard, and pass through a yoke 142, formed at the upper end of the standard. The rods 141 are threaded at their upper ends and have mounted thereon clamping-nuts 143, which bind upon a bearing-box 144, provided at opposite sides with guide-eyes 145, that receive the guide-rods 141. Through a flange formed in the standard 23 and located at the upper end thereof, there is threaded a pair of opposite journal-box-supporting bolts 146, whose upper ends take under and bear upon the aforesaid box 144. The boxes 137 and 144 are located opposite each other, or are in transverse alignment, and they receive and support a transverse shaft 147. Upon this shaft is mounted a large friction wheel or pulley 148, which is provided, in this instance, at diametrically opposite sides in its rim, with depressions 149. In front of the pulley there is also mounted on the shaft a large bevel-gear 150, which, in this instance, as best shown in Fig. 5, is provided with lugs 151, formed on its inner face, which are bolted at 152 to corresponding lugs projecting from the spokes or arms of the pulley 148. In the present instance the shaft 147 is fixed in its bearing, while the pulley and gear revolve freely thereon and together. If desired, however, this construction may be altered, that is to say, the shaft may be mounted loosely to revolve and the pulley and gear be keyed rigidly thereon and designed to revolve therewith. Such, however, are matters of detail, subject to the fancy of the skilled mechanic, and to such I do not limit my invention, not only in this regard, but in regard to other portions of the machine.

Referring more particularly to Figs. 5 and 14, 153 designates, in this instance, a pair of cam-lugs which are located upon the inner perimeter of the bevel-gear 150, at diametrically opposite points. The spokes of the pulley have secured to their rear edges a circular track or ring 155, and the same is provided upon its outer face, at diametrically-opposite points, with recesses 156. The spokes of the pulley are further provided, near their outer ends and upon their inner edges and at diametrically-opposite points, with a pair of inwardly disposed pins 157, which pins project into the path of an arm 158 that depends from the front right-hand side of the carriage. Securely bolted to the inner edge of the pulley-rim, as indicated at 159 and at diametrically-opposite points, is a pair of opposite segmentally-shaped racks 160, best shown in Fig. 14, whose outer edges are provided with a series of inclined rack-teeth 161.

A stud 162 Fig. 12 projects from the side of the feed table a slight distance in advance of the circular opening 163 formed therein opposite the drum 25, and loosely suspended upon this stud is a bell-crank shaped pawl, comprising an upper branch or lever-portion 164, which has pivoted to its lower end, at 165, a pawl portion or branch 166, and is provided upon its inner face in rear of the pivot 165 with a bevel-faced cam-lug 167, which projects into the path of, and is adapted to be struck by, a series of, in this instance, four pins 168, that project from the right side of the drum 25, all as shown in Fig. 12. The lever-portion 164 of the bell-cranked pawl is provided, just below its pivot 162, with a shoulder 169. A stud 170, best shown in Figs. 1 and 2, serves as a fulcrum for a bell-cranked hand lever 171, which is located a short distance in advance of the bell-cranked pawl 164. This lever has its upper branch provided with a rearward projection 172, and its lower branch 173 is provided with an oppositely-disposed lug 174, which rides against the rear face of the upper branch or lever portion 164 of the bell-crank. A pin 175 projects from the outer face of the lever-portion 164 of the bell-cranked pawl, and to this is attached a light coiled spring 176, whose lower end is attached to the pawl 166 in advance of its pivot, and therefore exerts a tendency to lift the same against a stop-lock 178, located upon the lever-portion 164 of the bell-crank immediately above its point of connection 165 with the pawl 166. A similar pin 179 projects from the hand-lever 171 above its fulcrum point 170, and a light coiled spring 180 connects the same with the pin 175. By drawing the hand-lever to the rear, the lug 174 of the lower branch thereof rides up the front edge of the lever-portion 164 of the bell-crank, and, exerting tension upon the spring 180, draws the bell-crank forwardly, whereby the pawl 166 is withdrawn from the path of the teeth 161 of the segmental rack-bars of the pulley 148, and the lug 174, engaging with the shoulder 169, interlocks therewith and maintains the bell-crank locked in an inoperative position. On the other hand, by throwing the lever 171 to the rear until the lug 172 thereof abuts against the pin 162, whereby the latter forms a stop, the arm 173 of the bell-crank lever releases the lever 164 from its locked position and forces the same to the rear, the arm and lever being maintained in contact through the tension of the spring 180. By this advancement of the bell-crank pawl, the latter is thrown into the path of the teeth 161 of the segmental rack-bars, and as the drum 25 revolves, and its pins successively contact with and ride under the face of the beveled or cam lug 167, the bell-cranked pawl is caused to oscillate or be swung to the rear, and being in engagement with the teeth 161 the pulley 148 is caused to be slightly revolved for a purpose hereinafter apparent.

As will be obvious from a detailed description of the operation, it becomes necessary at certain points of the revolution of the pulley 148, to lock the same against possibility of turning, and I have devised and illustrated two ways of accomplishing this function. Referring to Figs. 11, 8, and 9, wherein 25 designates the drum, 168 a trip-pin, and 148 the pulley, it will be seen that I provide the standard 23, heretofore mentioned, with a pair of bearing-ears 181, between which there is pivoted a detent or locking-pawl 182, whose free end is provided with a tooth 183. The inner face of the pawl is recessed at 184, and a lug 185 projects from the standard opposite the recess. Encircling the lug, and having one end seated in the recess, is a coiled spring 186, that serves to normally press the pawl outward or away from the standard and into engagement with any one of the recesses 156 of the circular track 155, over which the pawl travels. A bell-cranked lever 187 is fulcrumed at its angle, at 188, upon one edge of the standard 23. The outer branch of the bell-crank is slotted at 189 and is loosely connected by a pin 190 to the free end of the pawl. The inner branch of the bell-crank is curved to form a trip-arm 191 that lies in the path traveled by the pins 168. In Fig. 9 I employ the bearing-ears 181, the detent of pawl 182, and provide the same with a tooth 183. I, however, interpose between the standard and the pawl a V-shaped spring 192, one of whose branches bears against the inner face of the pawl 182, while the remaining branch is borne upon by a set-screw 193, that passes through the standard 23, and by means of which the tension of the spring may be regulated. The tooth 183, in this instance, is rounded, as are also the notches 156, of the track 155. In rear of the tooth the pawl is provided with a curved recess 194, and in the same terminates the end of the spring 192, which is curved or bent to fit within the recess. In opposite openings of the standards 114 and 23, there is supported a transverse shaft, best shown in Figs. 14 and 3 and designated as 196. This shaft supports rotatably thereon, a friction-pulley 197, the same comprising a hub 197$^a$ which terminates at its outer end in an annular flange 198, a series of leather disks or rings 199 that encircle the hub, a clamping-ring 200, that is mounted on the hub, and a series of binding-bolts 201, that pass through the clamping disk 200, the leather disks or rings 199, the flange 198, and a small beveled gear 202, that is loosely mounted on the shaft outside of or beyond the pulley and rigidly held in contact therewith by means of the bolts. This pulley 197 thus constructed, is maintained in frictional driving contact with the large pulley 148, which contact may be increased or diminished by means of the nuts 143 and 138, which are located upon the upper ends of the guide-rods 141 and 136. The gear 202 is situated opposite a somewhat larger bevel-gear 203, which is mounted upon a drive or power shaft 118. The standard 130 supports, at its upper end, a bearing-box 204, which is longitudinally opposite the bearing-box 137, which supports the shaft upon which is mounted the large friction-pulley. In one end of the box 137 and the box 204, there is mounted, rotatably, a short longitudinal shaft 205. Upon the shaft 205 there is mounted above the toothed pulley 132 a larger band-pulley 206, which is also toothed, and which is connected by a perforated belt 207 with the pulley 132. The pulley 206 is fixed upon the shaft so as to move with it and is provided at its rear side with an annular flange 208, which flange is provided with a recess 209, best shown in Fig. 4 of the drawings. A brake-pawl or lever 210 is pivoted at its lower end, at 211, to a projection from the front side of the standard 130, and has its free end connected by a coiled spring 212 with an eye-bolt 213, which passes through a perforated lug 214, mounted on the standard 130 and made adjustable by means of a thumb-nut 215, with which the eye-bolt is provided. The lever 210 is provided between its ends with a rounded lug or tooth 216 designed to ride over the face of the annular flange 208, which in reality constitutes a brake-pulley, and in a manner hereinafter apparent serves to overcome the momentum thereof and arrest the motion of certain mechanism, namely, the cutting-mechanism. 217 designates a beveled gear, that is mounted loosely on the shaft 205, and the same has its hub 218, best shown in Fig. 5, provided with the pivoted pawl 219, between which and the hub at one side of the pivot is interposed the coiled spring 220. The free end of the pawl is thus normally pressed inward toward the shaft 205, and it is provided with an extension or angular portion 221 that extends over and out of contact with a washer 222 and in the path of, in this instance, a shouldered lug 223, that projects from the periphery of a disk 224, which is keyed rigidly upon the shaft 205. A pin 225, best shown in Fig. 2 of the drawings, projects from the left side, and near the front end, of the movable carriage, and to the same is connected one end of a rope 226, that is passed over a guide-pulley 227, projecting from the frame, and at its free end is connected to a weight 228. Through the medium of this weight and rope, the carriage is held or aided in its return movement after a cut, as against the influence or resistance offered to such movement, by the advancing clay. The machine having been set in motion, that is, the belts thereof, the clay is started from the brick-machine over the feed-belt, which, as before described, has been adjusted so as to adapt itself to the height of the brick machine discharge. When the column of clay shall have reached the cutters, the bell-cranked lever 171 is swung to the rear to the position shown in Fig. 1, whereby the pawl 166, as heretofore described, is advanced to an operating position. The drum 25 receives its motion through the push of the clay, mainly, aided by the belt 37, as heretofore described; and, as it revolves, a pin 168 comes in contact with the inclined shoulder 167, and, by the formation of the same, causes the bell-cranked pawl to be moved to the rear, and it engaging with the segmental toothed rack-bar of the large friction-pulley 148, revolves the same slightly until the recessed portion 149 thereof passes by the small friction-pulley 199. Previous to this oscillation of the pawl and slight turning of the friction-pulley, the pin preceding the one that operates the said pawl comes in contact with the tail-end 191 of the lever that operates the locking-pawl 182, and thus withdraws said pawl from its locking engagement with the pulley and permits of the slight movement described of the pulley. As soon as the pulley is thus moved, the small friction-pulley, which is driven by the power-shaft, engages frictionally with the surface thereof, and imparts a half-rotation to said large pulley, that is said large pulley is rotated until the companion recess arrives opposite the small pulley, when the contact between the two is broken, and the momentum of the pulley is overcome and it is instantly stopped through the medium of the locking-pawl 182 that re-engages with one of the notches of the track 155 at the rear side of the pulley. Simultaneous with the rotation of the pulley, one of the T-shaped lugs 27, formed on the drum 25, engages with the pawl 70 of the carriage, and thus the entire carriage is moved in its ways from front to rear, or in other words from the feed-portion of the machine to the delivery portion thereof, and inasmuch as the drum is mainly operated by the clay, and the drum operates the carriage, it will be evident that the clay and carriage travel at precisely the same speed. Immediately after the pawl 166 has moved the pulley so as to re-engage with the small friction-pulley that drives it, the pawl 219 engages with the shoulder or lug 223 of the rigid disk 224, and thus, as the pinion 217 that carries the pawl, is being rotated, the disk and its shaft 205 become locked together and revolve. The rotation of the shaft is imparted, through the belt 207, the pulley 132, to the counter-shaft 131, and its elongated spur-gear 133, which communicates motion to the toothed rim that carries the series of cutters. The pulley 206 is twice the diameter of the pulley 132, so that the latter and the shaft 131 are rotated twice to a single rotation of the pulley 206. The spur-rim that carries the cutters has twice the number of teeth between each series of cutters that the elongated gear 133 is provided with, so that the two rotations of the latter gear will rotate the cutter-carrying rim a distance equal to that between the series of cutters. The pinion 217 having thus made one complete revolution, now becomes disengaged from the shaft through the medium of the cam 153, which has taken against the tail of the pawl 219, compressing the same against the tension of the spring 220, whereby the pawl is raised out of engagement with the shoulder 223 of the disk 224, so that the said pinion can revolve while the shaft 205, and consequently the cutting-mechanism, is at rest. At or about the same time that the disconnection between the pinion and shaft occurs, the pin 157 advancing toward the upper side of the drum now comes in contact with the depending arm 158 of the carriage, and serves to tilt or elevate the same together with the lever 166, thus drawing the pawl 70 out of engagement with the T-shaped lug 27 of the drum 25, with which it is previously in engagement, and thus aided by the weight 228 returns the carriage and its cutters to the first position where it receives the uncut or advance-end of the column of clay, after which the operation is repeated. It will be seen that the wire cutters pass between the pallets, leaving a brick or tile upon each, which the incoming-clay, during the return of the carriage and after the same is at rest, until the clay shall have turned the drum far enough for the next succeeding T-shaped lug to engage with the pawl of the carriage, will serve to push the cut brick or tile from the pallets onto the rear platform section of the carriage, the succeeding series of brick or tile, after having been cut, pushing the first series onto the front end of the delivery belt, from which they are taken by the truck-bearers. It will be understood that as the carriage is again advanced to the rear, the cutting mechanism is again operated in the manner before described. Inasmuch as the column of clay and the carriage that carries the cutters both move at the same speed, the cuts through the column of clay will be directly at a right angle to the same, so that perfect brick or tiles will result.

I would herein state that I do not limit my invention to the precise forms of gear or their proportions, which, as will be readily observed, may be changed in various ways to accomplish the same result, but what I have shown, so far as my experiments go, are deemed by me to be the most practical arrangement.

By means of the lever 171, it will be seen that in case of breakage of any of the cutters, which would be instantly noticed by the attendants, the pawl 166 may be withdrawn from operative engagement with the teeth of the pulley, and thus, though the belts will continue to move, the cutting mechanism and carriage will remain at rest. I have further provided a liberating lug 229 upon one of the front guide-frames 105, the same being provided with an inclined cam-face 230, as shown in Fig. 1, and by this means the arm 158 coming in contact with the cam-lug 229, will be elevated, as will also the pawl 70, and thus the carriage will be held stationary and out of influence by the lugs of the drum. The small drum or pulley 231 shown in full lines in Fig. 2 and dotted lines in Fig. 1, serves as a tightener for increasing the frictional contact between the driving drum 35 and the delivery belt 232 traveling on the same.

Having thus described my invention, what I claim is—

1. In a machine for cutting brick or tile, the combination with the framework, of a rotatable cutting device, a support for the same, means for reciprocating said cutting device, a gear adapted to engage teeth upon the cutting device, at any point of reciprocatory travel thereof, and means for intermittingly rotating said gear, substantially as specified.

2. In a machine for cutting brick and tile, the combination with the framework, of a rotatable reciprocating cutting device, a reciprocating peripheral support for the same, cross-bars carried by the cutting device, cutters carried by the cross-bars gear adapted to rotate said device, and engaged therewith at any point of its reciprocatory travel, and means for intermittingly rotating said gear, substantially as specified.

3. In a machine for cutting brick and tile, the combination with the framework and table, of a rotatable cutting device mounted for longitudinal reciprocation, a peripheral support, radially-disposed cutters, a fixed gear adapted to rotate said cutting device, and means for intermittingly rotating said gear, substantially as specified.

4. In a machine for cutting off brick and tile, the combination with the table, of a rotatable reciprocatory cutting device having radially disposed cutters, and peripheral teeth, a gear for rotating said cutting device, at any point of its reciprocatory travel and means for intermittingly rotating said gear, substantially as specified.

5. In a machine for cutting off brick or tile, the combination with the table, of a rotatable cutting device mounted for longitudinal reciprocation, a peripheral support therefor, cross-bars carried by said cutting device, cutting-wires extending radially from the cross-bars, means for reciprocating said cutting device, a gear engaging and adapted to rotate said cutting device, and means for intermittingly rotating said gear substantially as specified.

6. In a machine for cutting off brick and tile, the combination with the table, of a rotatable toothed cutting device having radial cutters, a support for the device, gear adapted to engage said cutting device and rotate the same, and means for communicating intermitting motion to the gear, substantially as specified.

7. In a machine for cutting off brick or tile, the combination with the table, of a fixed longitudinally-disposed shaft mounted adjacent to the table, a rotatable cutting device mounted thereon and provided with radial cutters, and teeth, a gear adapted to engage and rotate said cutting device, and means for intermittingly rotating the gear substantially as specified.

8. In a machine for cutting off brick or tile, the combination with the table adapted for longitudinal reciprocation, of means for reciprocating the table, a non-rotatable shaft longitudinally-disposed with relation to the table, clay-supporting devices supported by the shaft, a rotatable cutting device, a gear adapted to engage and rotate said cutting device, and means for intermittingly rotating the gear substantially as specified.

9. In a machine for cutting off brick and tile, the combination of the table, a rotatable cutting device, a peripheral support having longitudinal movement with the table, cross-bars carried by the rotatable cutter, a fixed shaft longitudinally-disposed with relation to the table, cutting wires between the shaft and the cross-bars of the rotatable cutter, supports for the clay sustained by the shaft, teeth upon the rotatable cutting device, automatic mechanism for engaging the teeth and intermittingly operating the cutter upon a bar of clay, whereby the same is cut into brick, substantially as specified.

10. In a machine for cutting off brick or tile, the combination with the table, and means for automatically reciprocating the same, of a rotatable cutting device having a longitudinal movement therewith, cross-arms carried by the rotatable cutter, a shaft longitudinally disposed with the table, cutting wires between the shaft and cross-arms, supports for the clay sustained by the shaft, and means for automatically rotating the cutter, substantially as specified.

11. In a machine for cutting off brick and tile, the combination with the table, of a pulley supported adjacent to the table, an intermediate shaft longitudinally disposed with relation to the table, and a rotatable cutting device having traveler-wheels journaled therein and riding on the pulley, substantially as specified.

12. In a machine for cutting off bricks and tile, the combination with the table mounted for longitudinal reciprocation, a peripheral support carried thereby, a fixed shaft, clay-supporting arms yieldingly supported by said shaft, a rotatable cutter mounted on traveler wheels for revolving on the peripheral support, substantially as specified.

13. In a machine for cutting off bricks and tile, the combination with the table mounted for longitudinal reciprocation, a peripheral support carried by the table, a cutting device mounted for revolving on the peripheral support, means for operating said cutting device, and a clay-supporting arm pivotally mounted on the shaft, and means for adjusting and yieldingly supporting said arm, substantially as specified.

14. In a machine for cutting off bricks and tile, the combination with the table, of means for automatically reciprocating the same, a longitudinally-disposed shaft, a cutting device having a series of cutters carried by the table, and a series of clay-supporting arms yieldingly mounted upon the shaft and having intervening spaces registering with the cutting devices, substantially as specified.

15. In a machine for cutting off bricks and tile, the combination with a reciprocating carriage having an intermediate opening, and means for moving the carriage, of a shaft longitudinally disposed at one side of the opening, a series of rotatable cutters, and a series of yieldingly-supported arms extending from the shaft across the opening and having intervening spaces aligning with the cutting devices, substantially as specified.

16. In a machine for cutting off bricks or tile, the combination with the table, of a shaft located at one side thereof, a rotary cutter moving about the shaft, ears depending from the shaft, an arm extending tangentially outward from the shaft, an arm pivoted intermediate its ends between the ears, a spring interposed between the outer arm and the rear end of the pivoted arm, and a stop mounted on the ears and bearing on the pivoted arm in front of its pivot, substantially as specified.

17. In a machine for cutting off bricks or tile, the combination of a table, a shaft at one side of the same, a hub upon the shaft, an arm extending outward from the hub, ears depending from the hub, a clay-supporting arm pivoted in the ears intermediate its ends, a spring interposed between the arm and the hub and the rear end of the pivoted arm, and an adjustable stop located in front of the fulcrum of the pivoted arm and bearing on said arm, substantially as specified.

18. In a machine for cutting off brick and tile, the combination with a table, of a shaft at one side of the same, a hub upon the shaft, an arm extending outward from the hub, ears depending from the hub, a cross-bar connecting the ears, a bolt threaded therein, an arm fulcrumed intermediate its ends within the ears and borne upon by the bolt, an eye-bolt passed through the rear end of the arm and having its upper end terminating in an eye pivotally connected with the outwardly-disposed arm of the hub, an adjustable head threaded on the bolt, and a coiled spring encircling the bolt and interposed between the head and the pivoted arm, substantially as specified.

19. In a machine for cutting off brick or tile, the combination with a suitable support, and a table, of a shaft located adjacent the table, a rim encircling the shaft, reversely-disposed yokes mounted on the shaft, and cutters connecting the yokes and rim, substantially as specified.

20. In a machine for cutting off brick and tile, the combination with a suitable support or table, of a shaft adjacent thereto, a rim having a series of transverse arms, reversely-disposed yokes mounted loosely on the shaft and arranged in series, and wires connected to the yokes and at intervals to the transverse arms, substantially as specified.

21. In a machine for cutting off brick or tile, the combination with the table, the shaft adjacent thereto, a rim, yokes loosely and reversely mounted on the shaft and removably interlocking at their centers with each other, and cutters leading from the yokes to the rim, substantially as specified.

22. In a machine for cutting off brick or tile, the combination with a table, of a shaft located adjacent thereto, a rim, yokes loosely mounted on the shaft and removably connected to each other, and cutting devices between the rim and yokes, substantially as specified.

23. In a machine for cutting off brick or tile, the combination with a table, of a shaft located adjacent thereto, a rim encircling the shaft, reversely-disposed yokes mounted loosely on the shaft, cutting devices between the rim and yoke, and means for adjusting the same, substantially as specified.

24. In a machine for cutting off brick or tile, the combination with the table, a shaft adjacent thereto, a rim encircling the shaft, of reversely-disposed yokes having intermediate arched portions embracing the shaft, and lugs engaging the arches of each other, and cutting devices between the extremities of the yokes and rim, substantially as specified.

25. In a machine for cutting off brick or tile, the combination with the table, the shaft, the rim encircling the shaft, of a pair of yokes having central arched portions and interlocking lugs embracing the shaft and removably engaging each other, said yokes terminating at their ends in angular portions having perforated lugs and provided with pins, threaded bolts mounted in the perforations, nuts for the bolts, wires connected to the rim, to the pins, and to the bolts, substantially as specified.

26. In a machine for cutting off brick or tile, the combination with a table, a shaft adjacent thereto, a pulley mounted on the shaft, a rim encircling the same, traveler-wheels between the rim and pulley, arms extending transversely through the rim, of a series of reversely-disposed yokes located at intervals on the shaft, and wire cutters extending from the arms to the ends of the yokes, substantially as specified.

27. In a machine for cutting off brick or tile, the combination with a table having an opening, a shaft at one side thereof, and a pulley on the shaft, of a rim surrounding the pulley, a series of yokes, wire-cutters between the yokes and rim, transverse arms passing through the rim for connection with the outer ends of the cutters, a series of hubs located on the shaft between the series of yokes and at each side of the pulley, and clay-supporting arms pivotally connected with the hub and spaced apart to receive the wires, substantially as specified.

28. In a machine for cutting off brick or tile, the combination with a table having an opening, and a shaft located at one side of the opening, of a separable pulley mounted on the shaft, a rim encircling the pulley and having wheels riding thereon, transverse arms extending through the rim, a series of pairs of yokes reversely disposed and embracing the shaft, wire-cutters between the outer ends of the yokes and the arms, hubs cast upon the shaft between the yokes, and yieldingly supported arms pivoted on the hubs, extending into the opening of the table, and provided with spaces for the reception of the wire-cutters, substantially as specified.

29. In a machine for cutting off brick or tile, the combination with a sectional table, a belt mounted for movement thereover, of means for raising and lowering said sections independently, substantially as specified.

30. In a machine for cutting off brick or tile, the combination with a sectional table, a belt moving thereover, of means for raising and lowering said sections independently, and means for locking the same at any point of their adjustment, substantially as specified.

31. In a machine for cutting off brick or tile, the combination with a sectional table, a belt moving thereon, of means for raising and lowering the upper section thereof, and a hinge-connection between the meeting ends of the sections, substantially as specified.

32. In a machine for cutting off brick or tile, the combination with a table divided from a point in front of its end to its end in a horizontal manner forming upper and lower sections, of a belt moving over the table, a hinge-connection at the adjacent ends of the sections, a pair of slotted standards, bolts extending through the slots in the standards, and nuts mounted on the ends of the bolts, substantially as specified.

33. In a machine for cutting off brick or tile, the combination with the horizontally divided table forming upper and lower sections hinged at their inner ends, said upper section being provided with a horizontal slot at each side, a metal frame surrounding each slot and forming upper and lower horizontal guides, and a lower lug, of journal boxes mounted for sliding in the guides, set-screws passed through the ends of the frames bearing on the boxes, standards secured to the lower section and having brackets, bolts passed through the standards and bearing against the lugs, a drum mounted between the walls of the table, a shaft for the drum journaled in the boxes, and a bolt passing over the drum, substantially as specified.

34. In a machine for cutting off brick or tile, the combination with the framework, a rotary cutter located adjacent thereto and provided with an uninterrupted series of teeth, a counter-shaft supported adjacent to the cutter, gear thereon engaging the teeth of the cutter, master-gear, and means for rotating the same and counter-shaft intermittingly, substantially as specified.

35. In a machine for cutting off brick or tile, the combination with the framework, the rotary cutter having an uninterrupted series of teeth, the counter-shaft, gear mounted thereon and engaging the teeth of the cutter, of means for intermittingly rotating the counter-shaft, substantially as specified.

36. In a machine for cutting off brick or tile, the combination with the framework, and the rotary cutter, having an uninterrupted series of peripheral teeth, of an intermittingly operated train of gearing engaging therewith, substantially as specified.

37. In a machine for cutting off brick or tile, the combination with the framework, the rotary cutter, a longitudinal shaft at the side of the frame, a clutch thereon, a master-gear, a pinion mounted on the longitudinal shaft and engaging the master-gear, means for driving the master-gear, automatic means for disengaging and engaging the clutch with the pinion, and means for transmitting motion from the longitudinal shaft to the rotary cutter, substantially as specified.

38. In a machine for cutting off brick or tile, the combination with the framework, the master gear, and means for driving the latter, of a shaft located at one side of the master-gear, a gear mounted loosely on the shaft and engaging the master-gear, a clutch splined upon the shaft, means for communicating motion from the shaft to the cutters, and devices carried by the master-gear for alternately throwing the shaft gear into and out of operation with said clutch, substantially as specified.

39. In a machine for cutting off brick or tile, the combination with the framework, the cutter, the master-gear, and means for operating the same, of a longitudinal shaft, a gear mounted loosely on the shaft and having a hub a pawl pivoted on the hub, a spring for pressing the pawl inwardly, a disk fixed upon the shaft and having a shoulder, cam-lugs mounted on the master-gear and extending into the path of the tail of the pawl, and means for communicating motion from the shaft to the cutter, substantially as specified.

40. In a machine for cutting off brick or tile, the combination with the framework, the rotary cutter, the longitudinal shaft 205, means for operating the same intermittingly and for communicating motion therefrom to the cutter, of a pulley mounted rigidly on the shaft, and a brake-lever yieldingly pressed into contact with the pulley, substantially as specified.

41. In a machine for cutting off brick or tile, the combination with the framework, the rotary cutter, the longitudinal shaft 205, means for intermittingly operating the same, of a pulley mounted to rotate with the shaft and having a recess in its periphery, and a brake-lever pivoted adjacent to the pulley and yieldingly supported in contact therewith and provided with a tooth for engaging with the recess, substantially as specified.

42. In a machine for cutting off brick or tile, the combination with the framework, a rotary cutter, a drum mounted in the framework, of a friction gear mounted at the side of the drum and provided with counter-sunk portions, a small friction gear located adjacent to the large friction gear and contacting therewith, means for communicating intermitting motion from the large friction gear to the cutter, a pivoted pawl located at one side of the large friction gear and adapted to engage teeth on the gear, means for retracting the pawl, and pins carried by the drum for reciprocating the pawl, substantially as specified.

43. In a machine for cutting off brick or tile, the combination with the framework, the drum mounted therein, the rotary cutter, the friction pulley, the segmental teeth secured to the pulley, the shaft for the pulley, and the gear mounted on the shaft and moving with the pulley, of a train of gear engaging with the gear and with the cutter, an oscillating pawl pivoted to the framework, means for retracting the same, pins mounted on the drum for oscillating the pawl into engagement with the teeth of the pulley, a small friction-pulley for engaging with the large one, and means for driving the small pulley, substantially as specified.

44. In a machine for cutting off brick or tile, the combination with the framework, the cutter, the master-gear having teeth, and the drum having pins, of the lever pivoted to one side of the master-gear, a pawl pivoted to the lower end of the lever and adapted to engage the teeth, a spring connecting the pawl and lever, a stop on the lever for the pawl, an inclined lug on the rear side of the lever adapted to be struck by pins on the drum, a bell-cranked hand-lever having its lower branch contacting with the said lever and adapted to engage with the shoulder on the same, and a coiled spring connecting the lever and hand-lever, substantially as specified.

45. In a machine for cutting off brick or tile, the combination with the framework, the cutter, the rotary drum, the master-gear, means for operating the same, and for transmitting intermittent motion from thence to the cutter, of recesses formed in the inner side of the master-gear, spring-pressed detents or pawls for yieldingly engaging the same, and devices mounted on the drum for removing the pawls from such engagement, substantially as specified.

46. In a machine for cutting off brick or tile, the combination with the framework, the cutter, the rotary drum, the master-gear, means for operating the same, and for transmitting intermittent motion from thence to the cutter, of a track located upon the inside of the gear and provided with recesses, a pawl pivoted and spring-pressed into engagement with the recesses, a lever fulcrumed at the inner side of the pawl and loosely connected therewith and extending into the path of pins projecting from the drum, and a spring for yieldingly pressing the lever upon the track, substantially as specified.

47. In a machine for cutting off brick or tile, the combination of the front and rear feeding and delivery sections of the framework, and the drums and their belts located thereon, said drums being opposite each other at the inner ends of the sections, band wheels upon the shafts of the drums, a yieldingly supported tightener pulley bearing against the under side of the belt connecting the band-wheels, of tracks or guides mounted on the sections, a reciprocating carriage mounted on the tracks or guides, the rear bottom section of the carriage normally overhanging the front drum of the delivery section, means for reciprocating the carriage entirely over the drum of the delivery section, a cutter mounted on the carriage, means for operating the cutter and moving the belts, substantially as specified.

In testimony that I claim the foregoing as my own I have hereto affixed my signature in the presence of two witnesses.

HORACE A. RIGGS.

Witnesses:
E. G. SIGGERS,
F. W. GARDNER.